United States Patent [19]

Rix

[11] Patent Number: 5,020,203

[45] Date of Patent: Jun. 4, 1991

[54] FUEL INJECTOR INSTALLATION AND REMOVAL TOOL FOR AN INTERNAL COMBUSTION ENGINE

[75] Inventor: David M. Rix, Columbus, Ind.

[73] Assignee: Cummins Engine Company, Inc., Columbus, Ind.

[21] Appl. No.: 501,028

[22] Filed: Mar. 29, 1990

[51] Int. Cl.[5] .................... B23P 19/04

[52] U.S. Cl. .................... 29/255

[58] Field of Search .................... 29/254, 255, 275, 263; 72/457, 705; 81/463

[56] References Cited

U.S. PATENT DOCUMENTS

| | | | |
|---|---|---|---|
| D. 264,300 | 5/1982 | Imm . | |
| 3,274,674 | 9/1966 | Hooper . | |
| 3,739,452 | 6/1975 | Gadberry . | |
| 3,896,654 | 7/1975 | Mancini | 29/255 |
| 4,110,886 | 9/1978 | Wendler et al. | 29/255 |
| 4,335,493 | 6/1982 | Schivers et al. | 29/254 |
| 4,561,159 | 12/1985 | Schuster | 29/255 |
| 4,665,602 | 5/1987 | Woodward et al. | 29/254 |

*Primary Examiner*—Robert C. Watson

*Attorney, Agent, or Firm*—Neuman, Williams, Anderson & Olson

[57] ABSTRACT

A high pressure fuel injector installation and removal tool for use on internal combustion engines can be used to precisely locate the fuel injector during installation. The installation tool provides an alignment guide, as well as the mechanical impulse necessary to fully seat the fuel injector in the base cavity. The alignment guide forms a location skirt with projected ears around the perimeter of the fuel injector during the installation procedure and thus provides a means to assure sufficient clearance between the fuel injector and surrounding components without need for visual alignment.

7 Claims, 4 Drawing Sheets

Fig. 6
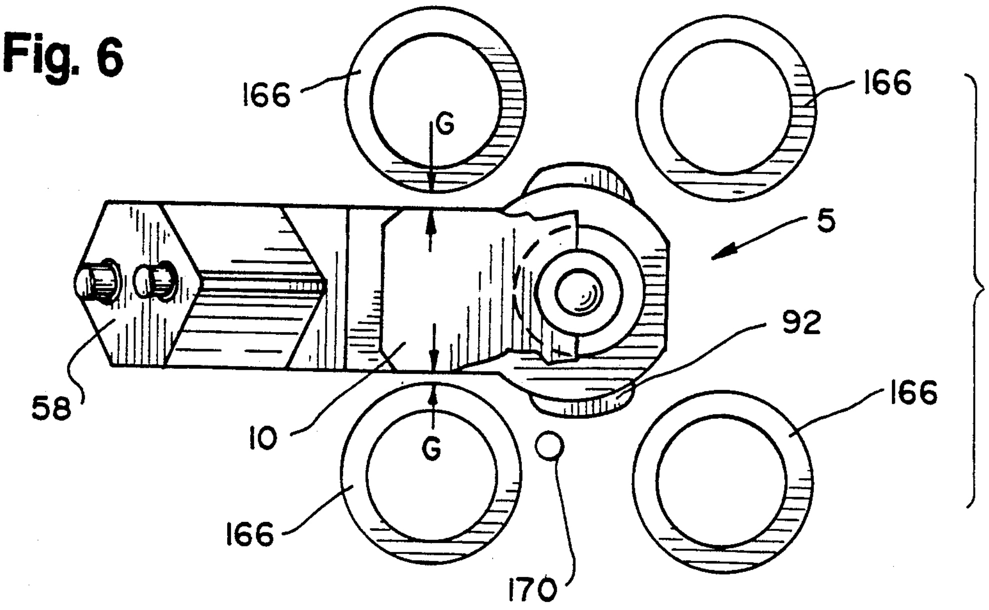
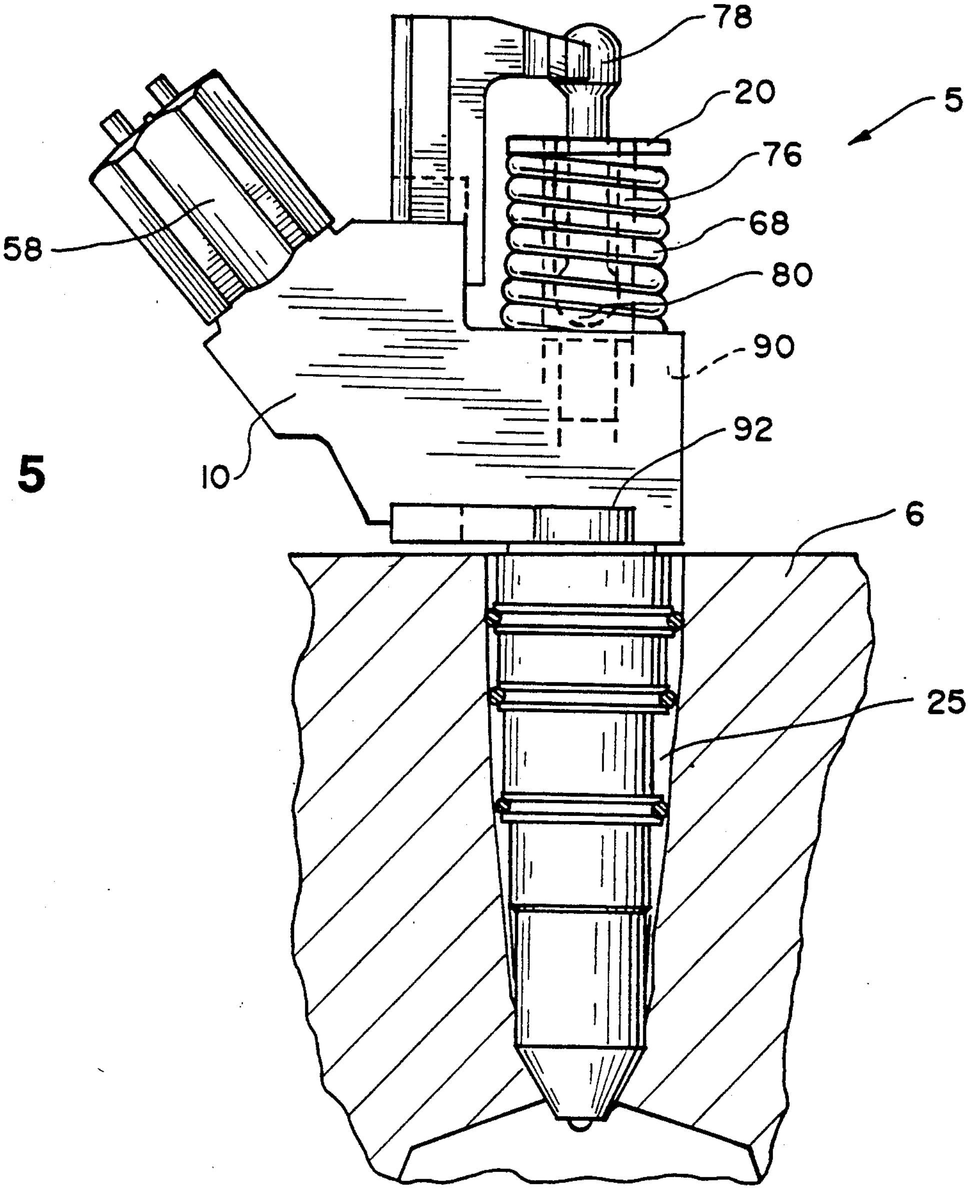
Fig. 5

FUEL INJECTOR INSTALLATION AND REMOVAL TOOL FOR AN INTERNAL COMBUSTION ENGINE

FIELD OF THE INVENTION

The present invention relates to an installation and removal tool for a fuel injector for an internal combustion engine and more specifically to a tool to physically align, position and seat the fuel injector during installation while maintaining clearances at desired tolerances between the installed fuel injector and the other components located in the engine cylinder head.

BACKGROUND OF THE INVENTION

Electronic fuel injectors are frequently used in today's internal combustion engines. The electronic fuel injector provides precise and reliable fuel delivery into the cylinder of compression ignition and spark ignition engines. The precision and reliability of the electronic fuel injector have contributed to the goals of fuel efficiency, maximum practicable power output and control of undesirable products of combustion. These and other benefits of electronic fuel injection systems are well known and are appropriately used to beneficial effect in the design of modern internal combustion engines.

Known electronic fuel injectors, especially those designed for application in compression ignition or spark ignition engines, utilize means to enhance fuel charge pressurization. Enhanced fuel charge pressurization is desirable during the fuel injection event to assure proper atomization and spray distribution of the fuel into the engine cylinder or pre-chamber. In addition, it is desirable to be able to determine the quantity of fuel used and to control injection timing for several reasons, including obtaining full combustion of the fuel to control particulate emissions. This has been of great interest in recent years, owing to environment concern and regulatory incentives. Finally, the proper control of fuel injectors reduces the amount of residual particulate formed in the compression ignition engine cylinder.

Several known types of fuel injectors include a means to enhance pressurization of the fuel charge. These fuel injectors typically have mechanical linkage systems coupled to the engine camshaft and/or cylinder head valve train assembly. Such fuel injectors are configured so that the camshaft or other rotating or reciprocating member acts on an injector link either directly or indirectly through a rocker arm.

The injector body and the integral associated components of the fuel injector are generally installed in cavities provided in the engine cylinder head. The base of each cavity generally is ported directly to the engine cylinder fueled by that particular fuel injector or to a precombustion chamber for subsequent delivery to the engine cylinder.

Once installed, fuel is provided to the injector typically via a fuel rail or fuel supply manifold at a fuel pressure of 150 psi. The injector then draws in fuel according to the operating conditions of the engine, thus metering the fuel charge. After the fuel charge is properly metered, the injection cycle continues with the pressurization of the predetermined fuel charge. At a preselected pressure, an injector nozzle is caused to open and injection into the engine cylinder or equivalent structure begins. Pressurization continues until the predetermined injection interval has passed, upon which the pressure generated within the injector is relieved and the injection cycle is terminated. At the peak of the pressurization process, it is possible for fuel pressure to reach 23,500 psi. Thus, a structure capable of withstanding great mechanical stress is desired within the injector assembly itself and within the base cavity area.

The most common solution to this structural demand is to form the injector cavity so that the injector assembly must be press-fitted within the cavity. A very tight fit between the injector assembly and the cavity creates, initially, a leak proof interface capable of maintaining the very high pressures developed. After installation, the injector assembly is restrained by a holddown clamp which engages holddown clamp ears or projections located on the exterior surface of the injector assembly. The holddown clamp is then securely bolted to the base material, which prevents the injector assembly from becoming loose and thus maintain the initial press-fit.

Various means are employed to obtain the initial press-fit between the injector assembly and the base cavity. A hydraulic or pneumatic press may be used, but mechanical impact tools are most commonly employed. These tools have the advantage of being inexpensive and portable, which is especially important relative to the replacement or repair of the fuel injector assembly. Since these repair or replacement operations are performed outside of the production facilities and at remote sites, a portable hand tool capable of satisfactorily providing the necessary press-fit is preferred.

Recent changes in the layout and design of modern compression engines has created severe difficulties with the use of hand operated mechanical impact devices. As the result of various incentives, such as the need for improved engine efficiency and lower emissions from smaller power plants, manufacturers are trending toward multi-valve engine cylinders. The result of this trend is to reduce the distances between the various components making up the engine head assembly, such as the valves, valve springs, rocker arms, push rods, fuel injectors and associated hardware. Further, the configuration of newer fuel injectors has increased the size of the injector relative to previous versions. Thus, installation or subsequent removal of the fuel injector without damaging adjacent parts has become more difficult. In addition, misalignments and errors in the installation of the fuel injector leading to component interference have become more frequent and often has resulted in the reduced durability of the components involved. Interference is especially undesirable when the valve spring is allowed to physically contact another component, since the valve spring rate may be changed after the spring material wears under the repeated contact with the interfering component. In many cases, the interfering component is the fuel injector.

Often, the misalignments and errors encountered during the installation of fuel injectors are the result of poor visual alignment, which is often difficult when the engine is being serviced as installed in the vehicle after the vehicle is initially placed in service. Existing fuel injector installation tools do not provide guidance features for the proper alignment and orientation of the fuel injector and thereby require visual alignment.

SUMMARY OF THE INVENTION

The portable hand-held fuel injector installation and removal tool of the present invention provides guidance for the proper alignment and orientation of a mechanically pressurized electronic fuel injector of the type described above. The installation and removal tool includes an alignment guide and an impact surface for providing the mechanical impulse necessary to fully seat the fuel injector in the base cavity. The alignment guide forms a location skirt during the installation procedure around the perimeter of the fuel injector and thus provides a means to assure sufficient clearance between the fuel injector and surrounding components. The location skirt comprises projected flats or ears that extend axially along the length of the fuel injector and provide a predetermined gap between the fuel injector and surrounding component. Once the fuel injector, which is properly aligned, is secured in place, interference is not encountered and the component's useful life is extended.

The above, and other related features of the present invention will be apparent from a reading of the following description of the drawings and the appended claims.

BRIEF DESCRIPTION OF DRAWINGS

FIG. 5 is a view of a typical high pressure fuel injector properly installed using the portable hand-held fuel injector installation and removal tool according to the invention herein disclosed;

FIG. 6 is an overhead view of a typical high pressure fuel injector properly- installed with the portable hand-held fuel injector installation tool as installed according to the invention herein disclosed.

BRIEF DESCRIPTION OF THE PREFERRED EMBODIMENT

Figure 1:
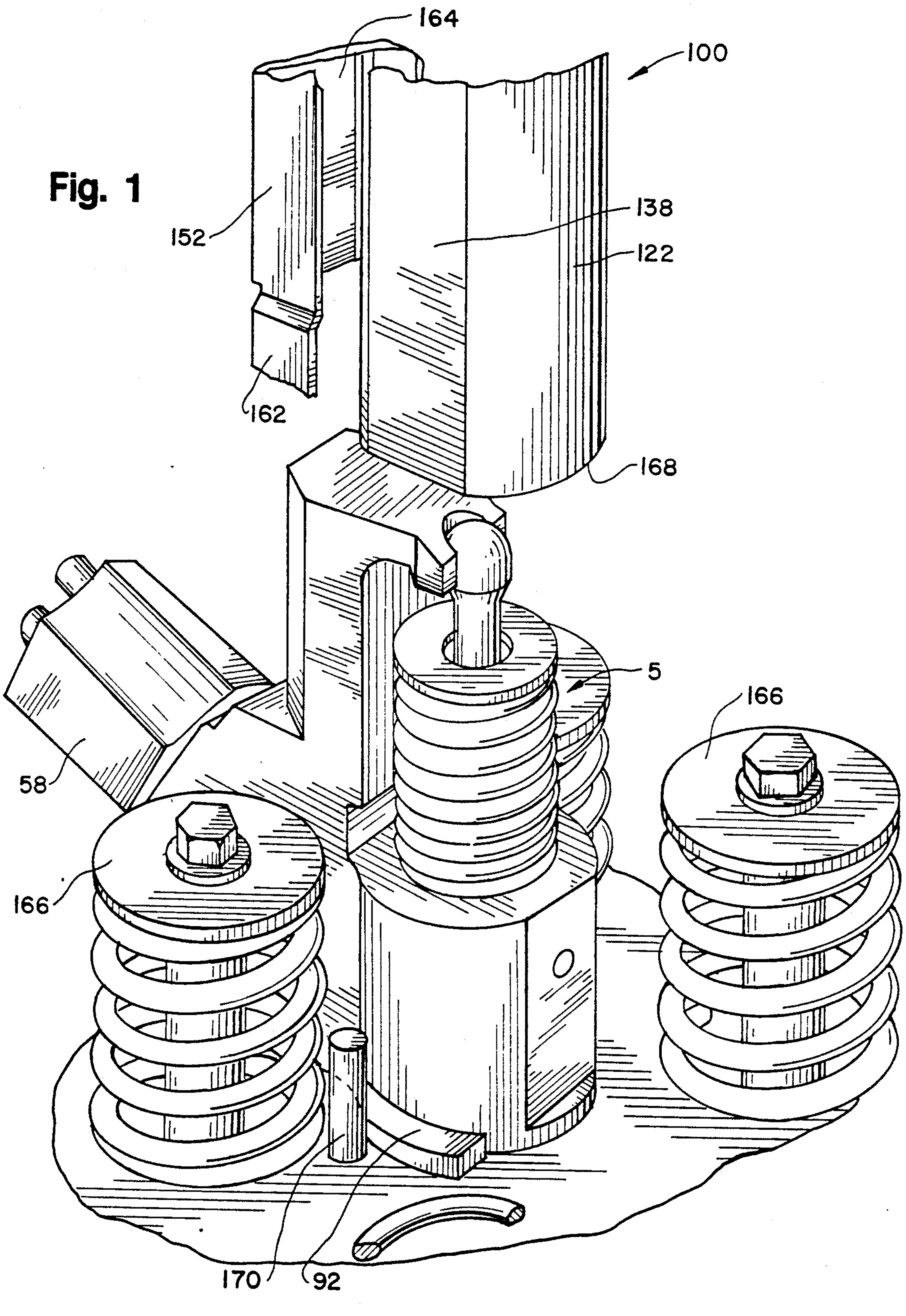
FIG. 1 is a view of the fuel injector assembly as installed according to the invention herein disclosed.
Figure 2:
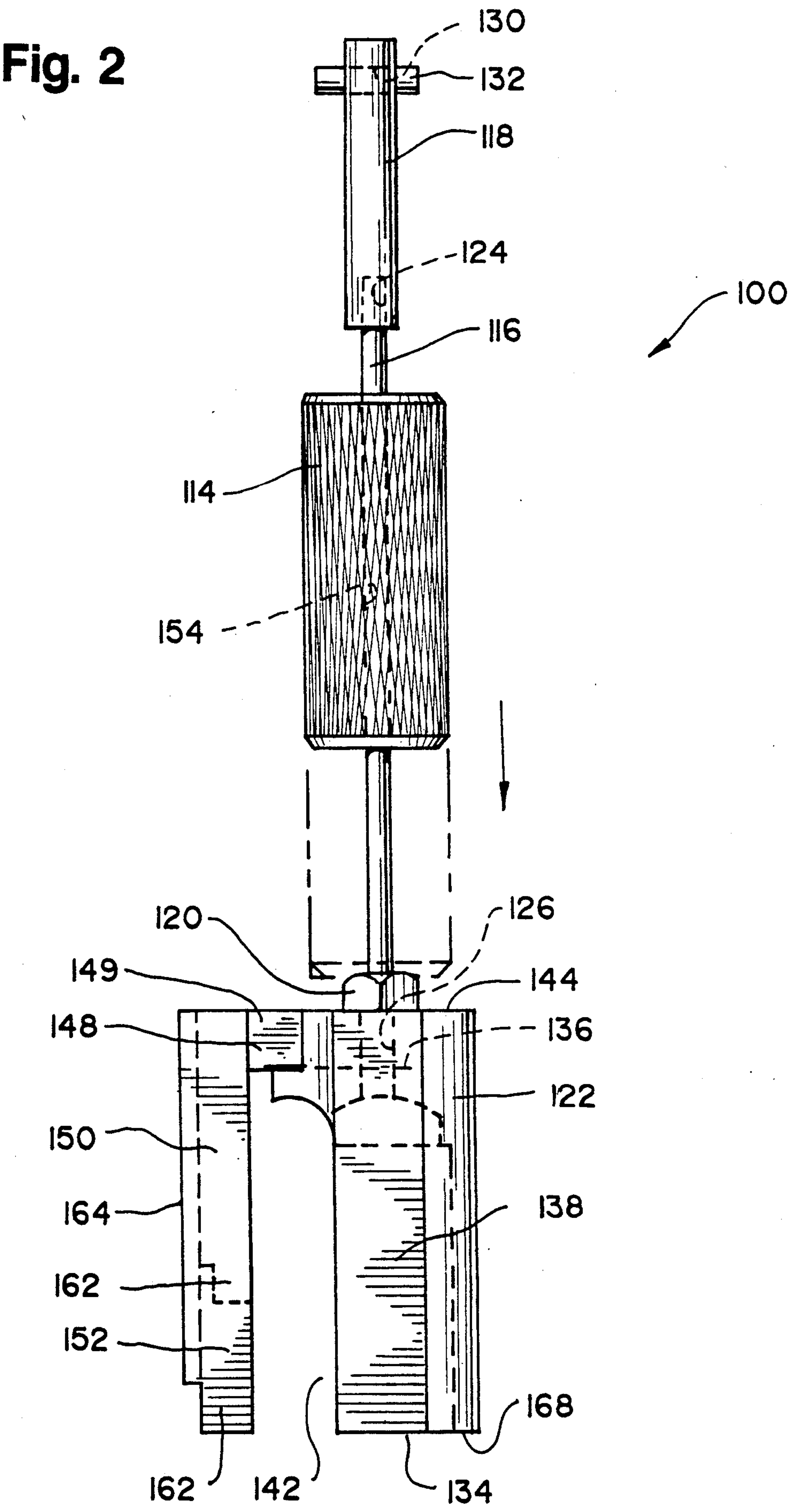
FIG. 2 is a plan view of a portable hand-held fuel injector installation and removal tool according to the invention herein disclosed.

Referring to the drawings, wherein reference characters designate like or corresponding parts throughout the views, FIG. 1 illustrates the overall configuration of the fuel injector assembly 5 as installed in the cylinder head 6 base material. A portion of the fuel injector installation and removal tool 100 is illustrated being withdrawn from the installed fuel injector assembly 5. FIG. 2 shows the overall configuration of the portable hand-held fuel injector installation and removal tool 100. The tool 100 comprises a slide hammer 114 with integral variable alignment guides 150 and 152. By reciprocating the slide hammer 114, along a tool shaft 116, impact loads may be applied to the injector assembly 5 to properly install the injector assembly 5.

The tool shaft 116 is preferably formed from cold rolled steel and defines the axis of the tool 100. One end of the tool shaft 116 is threaded to axially engage tapped orifice 124 provided in an injector puller 118. The injector puller 118 is further provided with a drilled hole 130 extending completely through the injector puller 118 in a direction perpendicular to the axis of the injector puller 118. A hardened dowel 132 is press-fitted into the hole 130, such that both ends of the dowel 132 extend a short distance (less than 0.5 in.) beyond the surface of the injector puller 118.

The other end of the tool shaft 116 is also threaded to engage tapped orifice 126 located in inner face 136 of driver 122. This may be best viewed in FIGS. 3 and 4. The driver 122 is made from 4140 steel and is substantially cylindrical. The diameter of the cylinder opening 134 located at the opposite distal end of the driver 122 engages the outer circumference of the injector body 10 (shown in FIG. 5). The inner face 136 is formed at one end of the driver 122 and is situated perpendicularly to the axis of tool shaft 116. The driver 122 is also provided with a pair of flat surfaces 138 located on opposite sides of the driver 122 along the outer longitudinal surface. The flats 138 are useful during the installation process to provide clearance between the driver 122 and any other components that may be located near the injector, such as cross head guides 170 shown in FIG. 1 and FIG. 6.

Returning to FIGS. 3 and 4, a portion of cylindrical wall 140 is removed from the cylinder forming the driver 122. The portion removed extends approximately three-quarters along the longitudinal axis of the driver 122, beginning at the opening 134, and approximately one third around the circumference of the driver 122. The resulting clearance cavity 142 allows the tool 100 to be useful in several injector configurations as will be discussed below.

At the other distal end of the driver 122, flat face 144 is formed parallel to the inner face 136. A generally rectangular recess 146 is formed in the face 144. The inner face 136 serves as the base for the recess 146, such that the recess 146 is able to receive flange 148 and 149 of guides 150 and 152, respectively. Positioned to abut either the flange 148 and/or 149 (depending on the nature of the injector to be installed or removed), nut 120 is rotatably adjustable on the tool shaft 116. The nut 120 is useful in restraining flange 148 and/or 149 so that either guide 150 and/or 152 can be secured to tool 100.

The slide hammer 114 is located between the injector puller 118 and the nut 120 on the tool shaft 116, as is shown in FIG. 2. The slide hammer 114 is movable along the entire length of the tool shaft 116. The slide hammer 114 is a solid and cylindrical unit made from 4140 steel, and is provided with a central axial channel 154 for receiving the tool shaft 116. The outer cylindrical surface of slide hammer 114 is preferably provided with a medium diamond knurl so as to ensure a firm grasp of the slide hammer 114 by the operator as the tool 100 is used. Each end of the slide hammer 114 is preferably chamfered so as to avoid sharp edges near the grasp of the operator.

Figure 7A:
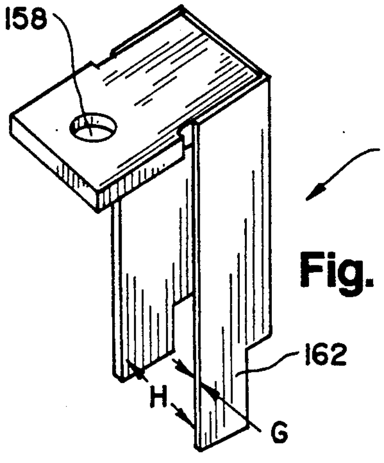
FIGS. 7(*a*) and 7(*b*) are perspective views of the guide portion of the portable hand-held fuel injector installation and removal tool according to the invention herein disclosed.
Figure 7B:
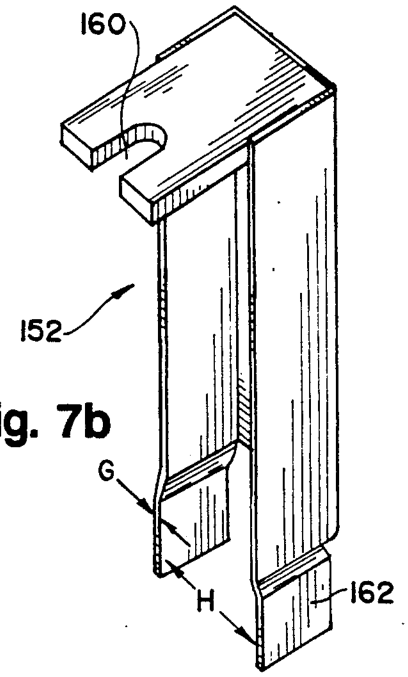

Guides 150 and 152, as seen in FIG. 7(*a*) and FIG. 7(*b*) respectively, are formed into the shape of a longitudinal channel, such that each forms a U-shaped open tube. The walls 156 are separated by the distance necessary to fittingly engage the outer surface of injector control solenoid 58 and the related structure of injector body 10. At one end of guides 150 and 152, the flanges 148 and 149, respectively, are welded in place so as to close one open end of the guides 150 and 152.

Figure 3:
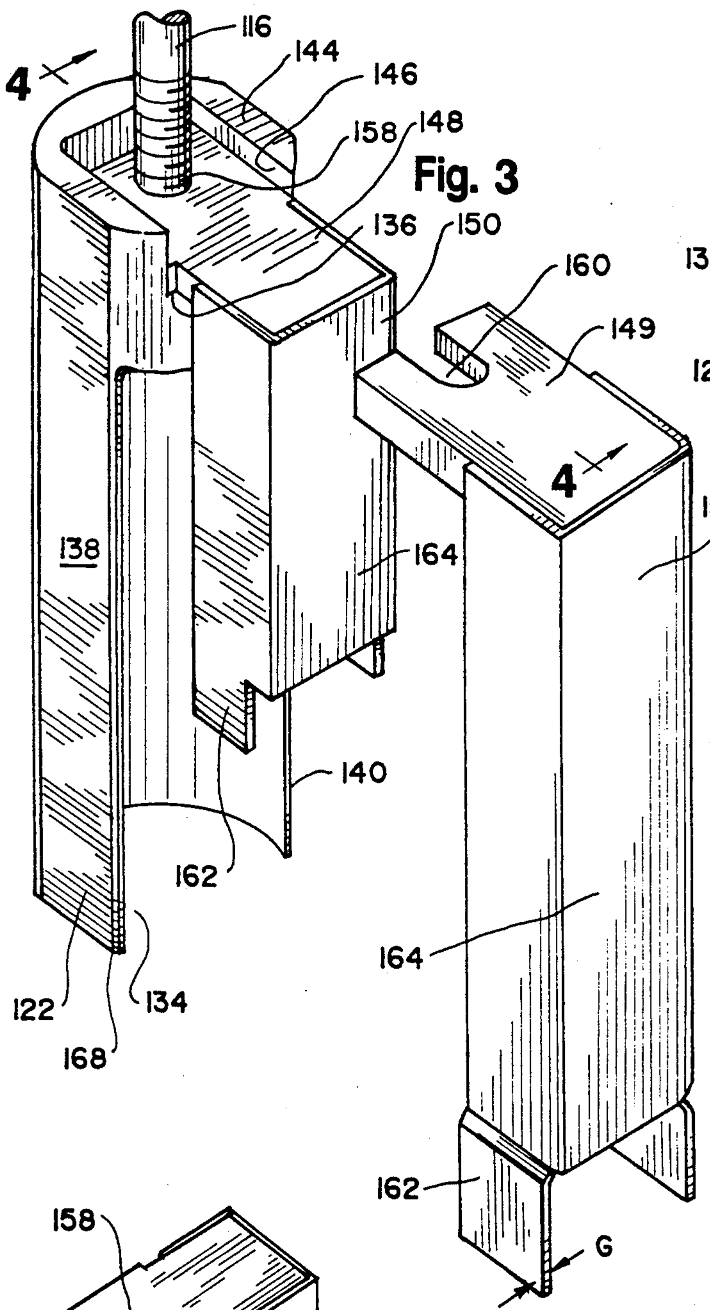
FIG. 3 is a perspective view of the installation portion of the portable hand-held fuel injector installation and removal tool according to the invention herein disclosed.
Figure 4:
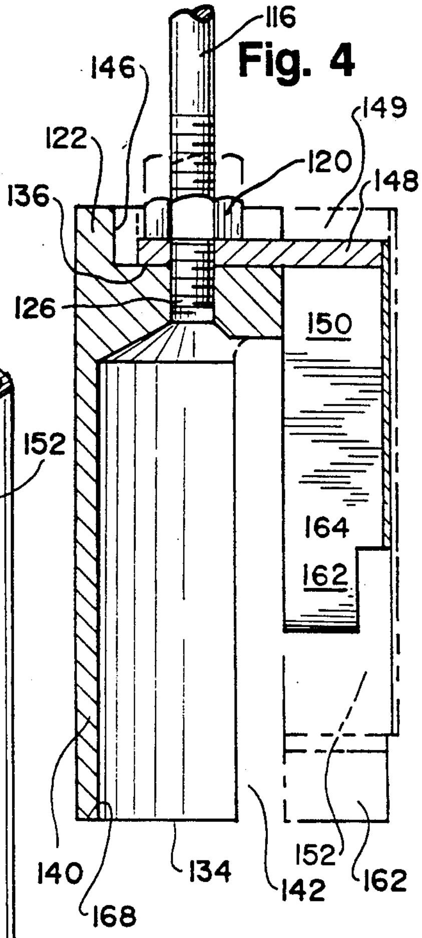
FIG. 4 is a sectional view of the installation portion of the portable hand-held fuel injector installation and removal tool according to the invention herein disclosed.

The flange 148 is affixed to guide 150 and is provided with a hole 158 for receiving the tool shaft 116, which may be best viewed in FIG. 3. When installing one version of the high pressure fuel injector 5, only the guide 150 is used. In such a situation, the nut 120 is adjusted so as to rigidly clamp the flange 148 to the bottom of the recess 146 formed in the driver 122. The flange 149, affixed to the guide 152, is provided with a slot 160, which also receives the tool shaft 116. When installing another version of the high pressure fuel injector 5, both the guides 150 and 152 are used. In such a situation, the nut 120 is adjusted so as to rigidly clamp the flanges 148 and 149 to the bottom of the recess 146 formed in the driver 122.

The opposite distal end of the guides 150 and 152 are each provided with a pair of ears 162, formed on opposite sides of the guides 150 and 152, the pair of ears 162 extend further in the longitudinal direction than center portion 164 of the guides 150 and 152. As shown in FIG. 7(*a*), the ears 162 of guide 150 are also separated by the distance H necessary to receive the outer surface of the injector control solenoid 58 and the related structure of injector body 10. Further, the ears 162 are formed of a thickness of 4140 steel at least equal to the clearance G (also seen in FIG. 6) that is necessary to avoid interference between the injector assembly 5 and the valve springs 166. Thus, as can be most readily viewed in FIG. 6, the proper clearance G between these structures is maintained without the need for visual assurance by the tool operator.

FI G. 5 illustrates the overall configuration of a modern mechanically assisted electronic fuel injection assembly 5. The injector body 10 is formed preferably as a forged unit. The top of the injector body 10 receives coupling member 20. The exterior of the injector body 10 is provided with orifice 90, which, as discussed above, allows the dowel 132 to transfer the removal loads to the injector assembly 5. Also, holddown clamp ears 92 are formed in the injector body 10, which are used to react a vertical load on the injector assembly during installation and to receive the holddown clamp (not shown) to restrain the fuel injector assembly 5 during engine operation.

As may be observed in FIG. 5, the projecting end of the dowel 132 allows the injector puller 118 to engage the corresponding orifice 90 in the injector body 10. After the dowel 132 is so engaged, the tool 100 may be operated to apply an impact force in the axial direction away from the injector assembly 5 so as to dislodge injector assembly 5 from the base cavity 25.

At the exposed end of coupling member 20, pocket 76 and bearing surface 80 are formed, upon which link 78 acts to force the coupling member 20 against the force created by return spring 68 during the injection stroke. Link 78 is in typical contact with the injection train camshaft (not shown) and reciprocates along the central axis of injector assembly 5 in response to the angular position of the actuating cam (not shown). Thus, rotational motion of the camshaft is converted into reciprocal motion of the injector assembly 5 axial components so as to provide force useful in pressurizing a timing plunger chamber and, ultimately, a metering plunger chamber.

As is clear from FIGS. I and 5, it is critical that the top portion of the fuel injector assembly 5 not be damaged during the installation process. The operation of the tool 100 is directed to avoid damage to the top portion of the fuel injector assembly 5, yet provide a proper seating of the injector assembly 5 without interference with other components.

The injector assembly 5 is hand fitted into the cavity 25, which is pre-formed in the base material (such as the cylinder head floor). The proper guide 150 and/or guide 152 is then selected, Where the guide(s) are then secured to the tool 100 via the nut 120. The tool 100 is then slidingly fitted over the top of the injector assembly 5, where bearing edge 168 of the driver 122 supports the tool 100 against the hold-down clamp ears 92 of the injector 5. The guides 150 and/or 152 are so located that the ears 162 are positioned on each side of the solenoid control valve 58 and associated injector body 10.

The slide hammer 114 is then lifted toward the injector puller 118 and is rapidly pulled down along the tool shaft 116 onto the nut 120. Thus, an impact load is transmitted from tool 100 through bearing edge 168 to the hold-down clamp ears 92 of the injector body 5. This impact load tends to drive the injector assembly 5 into the cavity 25. This process is repeated until the injector assembly 5 is firmly seated in the cavity 25. During this operation, the ears 162 have maintained at least a minimum clearance G between injector assembly 5 and the valve springs 166, as can be seen in FIG. 6. The tool 100 is then removed and the hold-down clamp (not shown) is then installed to finally secure the injector assembly 5.

The removal process is similar, except the dowel 132 engages the orifice 90 machined in the outer surface of injector assembly 5. The slide hammer 114 is similarly operated to loosen the injector assembly 5 by the application of repeated impacts upward away from the injection assembly 5.

Thus, a simple and inexpensive portable hand-held fuel injector installation tool 100 is disclosed that is useful in the press-fit of high pressure electronically controlled fuel injectors into the base cavity 25. Further, this tool 100 is useful to positively assure that the necessary clearances between the fuel injector 5 and surrounding components are maintained at all times.

A preferred embodiment of the present invention has been described, however, it is not intended to limit its spirit and scope. It will be understood that various changes in the details, arrangements and configuration of the parts which have been described and illustrated above in order to explain the nature of the present invention may be made by those skilled in the art within the principle and scope of the present invention as expressed in the appended claims.

What is claimed is:

1. A fuel injector installation tool for use in an internal combustion engine with at least one engine component located proximate to the fuel injector, comprising:

a central shaft forming the axis of said tool, an end member attached to one end of said central shaft, a driver member attached to the opposite end of said central shaft, said driver member having a generally cylindrical shape and adapted to slidingly receive the fuel injector to be installed, a slide hammer for creating a force necessary to install said fuel injector, said slide hammer engaging said central shaft and being positioned between said end member and said driver member, an impact surface located between said slide hammer and said driver member for transmitting said force from said slide hammer through said drive member to said fuel injector, and a first alignment guide means attached to said central shaft and positioned adjacent to and spaced from said driver member for shielding said injector from other engine components and guiding said injector to the proper location on the engine.

2. The fuel injector installation tool as set forth in claim 1 wherein said first alignment guide means having a first end and a second end and an open channel shape with two side walls and a front wall and a flange for attaching said first alignment guide means to said shaft, said flange extending from said first end of said first alignment guide means closing said first end, and said first alignment guide means further comprising a pair of projections each extending from one of said side walls to shield said injector from other engine components.

3. The fuel injector installation tool of claim 2, further comprising a second alignment guide means substantially surrounding said first alignment guide means.

4. The fuel injector installation tool as set forth in claim 1, further comprising, second alignment guide means having a first end and a second end and an open channel shape with two side walls and a front wall and a flange for attaching said second alignment guide means to said shaft, said flange extending from said first end of said second alignment guide means closing said first end, and said second alignment guide means further comprising a pair of projections each extending from one of said side walls for shielding said injector from other engine components and for guiding said injector to the proper location on the engine.

5. The fuel injector installation tool as set forth in claim 1, wherein the impact surface is a nut adjustably engaging one end of said central shaft adjacent to said driver member, said nut being adapted to receive the force created by said slide hammer, and applying a clamping load to said flange of said alignment guide for securing said alignment guide to said shaft.

6. A fuel injector installation and removal tool for use in an internal combustion engine with at least one engine component located proximate to the fuel injector, comprising:

a central shaft forming the axis of said tool, an end member attached to one end of said central shaft, a driver member attached to the opposite end of said central shaft, said driver member having a generally cylindrical shape and adapted to slidingly receive the fuel injector to be installed, a slide hammer for creating a force necessary to install said fuel injector, said slide hammer engaging said central shaft and being positioned between said end member and said driver member, an impact surface located between said slide hammer and said driver member for transmitting said force from said slide hammer through said driver member to said fuel injector, alignment guide means attached to said central shaft and positioned adjacent to and spaced from said driver member for shielding said injector from other engine components and guiding said injector to the proper location on the engine, said end member comprising a dowel, said dowel being positioned perpendicular to the axis of said tool, and said dowel extending beyond the circumferential surface of said end piece and being adapted to engage said injector and transfer to said injector a removal force developed by the action of said sliding hammer.

7. The fuel injector installation tool of claim 4, wherein said second alignment guide means substantially surrounds said first alignment guide means.

* * * * *